(12) United States Patent
Suzuki

(10) Patent No.: US 7,975,218 B2
(45) Date of Patent: Jul. 5, 2011

(54) APPARATUS AND METHOD FOR FORMING DOCUMENT GROUP STRUCTURE DATA AND STORAGE MEDIUM

(75) Inventor: Akira Suzuki, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 2048 days.

(21) Appl. No.: 10/866,686

(22) Filed: Jun. 15, 2004

(65) Prior Publication Data

US 2005/0050029 A1     Mar. 3, 2005

(30) Foreign Application Priority Data

Aug. 29, 2003   (JP) ................................ 2003-306898

(51) Int. Cl.
    *G06F 17/00*    (2006.01)
(52) U.S. Cl. .......................................... 715/234; 707/3
(58) Field of Classification Search ............... 715/501.1, 715/513, 517, 854, 234–236; 345/418; 707/3
    See application file for complete search history.

(56) References Cited

U.S. PATENT DOCUMENTS

| | | | | |
|---|---|---|---|---|
| 6,476,833 B1* | 11/2002 | Moshfeghi | ..................... | 715/854 |
| 6,556,984 B1* | 4/2003 | Zien | ................................ | 707/2 |
| 2001/0054049 A1* | 12/2001 | Maeda et al. | ................. | 715/517 |
| 2002/0156814 A1* | 10/2002 | Ho | ................................ | 707/514 |
| 2006/0122917 A1* | 6/2006 | Lokuge et al. | ................. | 705/27 |
| 2006/0288023 A1* | 12/2006 | Szabo | .......................... | 707/100 |
| 2007/0156761 A1* | 7/2007 | Smith, III | .................. | 707/104.1 |

FOREIGN PATENT DOCUMENTS

| JP | A 6-35657 | 2/1994 |
|---|---|---|
| JP | A 2002-28825 | 10/2002 |

\* cited by examiner

*Primary Examiner* — Doug Hutton
*Assistant Examiner* — Quoc A Tran
(74) *Attorney, Agent, or Firm* — Oliff & Berridge, PLC

(57) ABSTRACT

The apparatus for forming a document group structure data contains a base document specifying section that specifies plural documents to be positionally fixed on the tree structure as base documents based on an input from a user, an upper tree structure forming section that forms an upper tree structure data showing a hierarchical relation among the base documents based on positional information of the base documents in the directory structure, a lower tree structure forming section that forms lower tree structure data showing tree structures of document groups having the base documents as root nodes, respectively, by following links of the hypertext structure starting from the respective base documents, and a tree structure combining section that forms a tree structure data showing the hypertext structure by combining the upper tree structure data and the respective lower tree structure data.

5 Claims, 7 Drawing Sheets

FIG. 7A

| NODE ID | URL | CHILD NODE |
|---|---|---|
| S001 | http://example.co.jp/ | S002, S003, I001 |
| S002 | http://example.co.jp/product/ | I002 |
| S003 | http://example.co.jp/download/ | I007 |

| NODE ID | URL | DISPLAY DATA | CHILD NODE |
|---|---|---|---|
| I001 | http://example.co.jp/index.html | TOP PAGE OF ABCD CORP. | — |
| I002 | http://example.co.jp/product/index.html | PRODUCT PAGE | I003, I004, I005 |
| I003 | http://example.co.jp/product/a.html | PAGE OF PRODUCT A | — |
| ..... | ..... | ..... | ..... |
| I006 | http://example.co.jp/download/index.html | DOWNLOAD PAGE | I007, I011 |
| I007 | http://example.co.jp/download/driver/index.html | PAGE FOR DOWNLOADING DRIVERS | I008, I009, I010 |
| I008 | http://example.co.jp/download/driver/a.html | PAGE FOR DOWNLOADING DRIVER FOR PRODUCT A | — |
| ..... | ..... | ..... | ..... |
| I011 | http://example.co.jp/download/siyou/index.html | PAGE FOR DOWNLOADING TRIAL VERSIONS | — |

| NODE ID | URL | NODE CLASS | DISPLAY DATA | CHILD NODE |
|---|---|---|---|---|
| I001 | http://example.co.jp/index.html | REAL | TOP PAGE OF ABCD CORP. | I012, I013 |
| I002 | http://example.co.jp/product/index.html | REAL | PRODUCT PAGE | I003, I004, I005 |
| I003 | http://example.co.jp/product/a.html | REAL | PAGE OF PRODUCT A | — |
| ..... | ..... | ..... | ..... | ..... |
| I006 | http://example.co.jp/download/index.html | REAL | DOWNLOAD PAGE | I007, I011 |
| I007 | http://example.co.jp/download/driver/index.html | REAL | PAGE FOR DOWNLOADING DRIVERS | I008, I009, I010 |
| I008 | http://example.co.jp/download/driver/a.html | REAL | PAGE FOR DOWNLOADING DRIVER FOR PRODUCT A | I014 |
| ..... | ..... | ..... | ..... | ..... |
| I011 | http://example.co.jp/download/siyou/index.html | REAL | PAGE FOR DOWNLOADING TRIAL VERSIONS | — |
| I012 | http://example.co.jp/product/c.html | REFERENCE | PAGE OF PRODUCT C | — |
| I013 | http://example.co.jp/download/driver/a.html | REFERENCE | PAGE FOR DOWNLOADING DRIVER FOR PRODUCT A | — |
| I014 | http://example.co.jp/download/driver/a.html | REFERENCE | PAGE FOR DOWNLOADING DRIVER FOR PRODUCT A | — |

APPARATUS AND METHOD FOR FORMING DOCUMENT GROUP STRUCTURE DATA AND STORAGE MEDIUM

BACKGROUND OF THE INVENTION

1. Field of the Invention

The present invention relates to an apparatus for expressing relationship of a document group having a hyperlink structure in a tree structure, and a method therefor.

2. Description of the Related Art

A document group on the World Wide Web (WWW) forms a hypertext structure (which is also referred to as a hyperlink structure) with documents as nodes and links among the documents as arcs. The hypertext structure has such an advantage that arbitrary documents can be easily connected by links, but in the case where the number of documents is increased to complicate the relationship among the document, the relationship among the documents is difficult to be comprehended by humans since it is basically a network structure.

Under the circumstances, method for simplify the hypertext structure to display in a tree structure has been used. Examples of the method include a method described in JP-A-6-35657. In this method, in the case where a hypertext structure having plural nodes linked to one node (which is assumed as node A) is converted to a tree structure, one of the plural nodes is selected, and the node A is disposed as a child of the selected node, reference nodes for showing the node A are disposed as children for the other nodes linked to the node A. In this process, upon following the links of the hypertext structure, the link root node upon firstly reaching the node A is designated as a parent of the real node A on the tree structure. The reference nodes are displayed in a different manner from the real nodes constituting the tree structure. The reference nodes indicate the same document as the real node A, but the relationship on the tree structure is shown by the real node A as the representative. Therefore, the reference node has no child node.

JP-A-2002-288225 also describes an apparatus for displaying a hypertext structure in a tree structure.

The web site management tool "GoLive", produced by Adobe Systems, Inc., has such a function that upon designating a starting document on WWW, the hypertext structure is inspected by sequentially following the links from the document, and upon designating one document in the hypertext structure, a tree structure is formed and displayed based on the hypertext structure with the selected document as a root node.

In the case where a hypertext structure is converted and displayed in a tree structure by these conventional methods, the sequence of following the links of the hypertext structure determines the position of a certain document on the tree structure, i.e., which the plural nodes on the hypertext structure become a child of the node. Accordingly, the position of the document on the tree structure may change by changing a link description of another document even though the document itself is not changed. In the case where the position of the real node is changed on the tree structure, the positions of all the nodes in the sub-tree extending from the real node are changed. Therefore, there is such a problem that even in the case where a user memorizes a position of a certain document on a tree structure and thereafter attempt to access the document, it becomes difficult to explore the document because the position of the document on the tree structure is changed.

Furthermore, because hypertext links can be freely configured, a tree structure formed from a hypertext structure has no direct relationship to the conceptual classification of the documents constituting the hypertext structure. Therefore, even in the case where, for example, the relationship of documents in a web site is displayed in a tree structure formed from the hypertext structure, it cannot be always such an expression that is intelligible and memorable to a user. For example, a top page of a web site has links to miscellaneous renewal information in addition to index pages of subordinate classes, and in the case where it is simply expressed in a tree structure, the index pages and the renewal information pages, which have different concepts, are equally displayed, which is not intelligible to a user.

SUMMARY OF THE INVENTION

The invention has been made in view of the aforementioned circumstances and provides an apparatus for forming a document group structure data and a method therefor for solving at least one of the problems associated with the conventional techniques.

According to an aspect of the invention, there is provided the apparatus for forming a document group structure data that forms a tree structure data showing a tree structure corresponding to a hypertext structure constituted by a document group contained in a hierarchical directory structure, based on the hypertext structure, the apparatus for forming a document group structure data containing a base document specifying section that specifies plural documents to be positionally fixed on the tree structure as base documents based on an input from a user, an upper tree structure forming section that forms an upper tree structure data showing a hierarchical relation among the base documents based on positional information of the base documents in the directory structure, a lower tree structure forming section that forms lower tree structure data showing tree structures of document groups having the base documents as root nodes, respectively, by following links of the hypertext structure starting from the respective base documents, and a tree structure combining section that forms a tree structure data showing the hypertext structure by combining the upper tree structure data and the respective lower tree structure data.

In this constitution, the term "input from a user" formed the foundation upon specifying base documents herein means, for example, information of a stored position of the base document in the directory structure (e.g., URL). It is also possible that a combination of a designation of a web site and a number of hierarchies can be received as the "input from a user" to specify a base document group based on the combination (which will be described in detail later).

The term "nearest ancestor" herein encompasses the directory itself that stores the linked document.

According to another aspect of the invention, a method for forming a document group structure data is provided that forms a tree structure data showing a tree structure corresponding to a hypertext structure constituted by a document group contained in a hierarchical directory structure, based on the hypertext structure by a computer processing, the method for forming a document group structure data containing steps of: specifying plural documents to be positionally fixed on the tree structure as base documents based on an input from a user, forming an upper tree structure data showing a hierarchical relation among the base documents based on positional information of the base documents in the directory structure, forming lower tree structure data showing tree structures of document groups having the base documents as root nodes, respectively, by following links of the hypertext structure starting from the respective base documents, and forming a tree structure data showing the hypertext structure by combining the upper tree structure data and the respective lower tree structure data.

According to still another aspect of the invention, a storage medium readable by a computer is provided, the storage medium storing a program of instructions executable by the computer to perform a function for forming a document group structure data that forms a tree structure data showing a tree structure corresponding to a hypertext structure constituted by a document group contained in a hierarchical directory structure, based on the hypertext structure, the function for forming a document group structure data including steps of: specifying plural documents to be positionally fixed on the tree structure as base documents based on an input from a user, forming an upper tree structure data showing a hierarchical relation among the base documents based on positional information of the base documents in the directory structure, forming lower tree structure data showing tree structures of document groups having the base documents as root nodes, respectively, by following links of the hypertext structure starting from the respective base documents, and forming a tree structure data showing the hypertext structure by combining the upper tree structure data and the respective lower tree structure data.

BRIEF DESCRIPTION OF THE DRAWINGS

The present invention will be described in detail based on the following figures, wherein:

FIG. 7A is a diagram showing data contents of a part of a tree structure data showing the tree structure shown in FIG. 6 corresponding to an upper tree structure;

FIG. 7B is a diagram showing data contents of a part of a tree structure data showing the tree structure shown in FIG. 6 corresponding to a lower tree structure; and FIG. 8 is a diagram showing data contents of a lower tree structure in the case where reference nodes are also displayed.

DETAILED DESCRIPTION OF THE INVENTION

The best mode for carrying out the invention (hereinafter, referred to as an embodiment) will be described with reference to the drawings.

Figure 1:
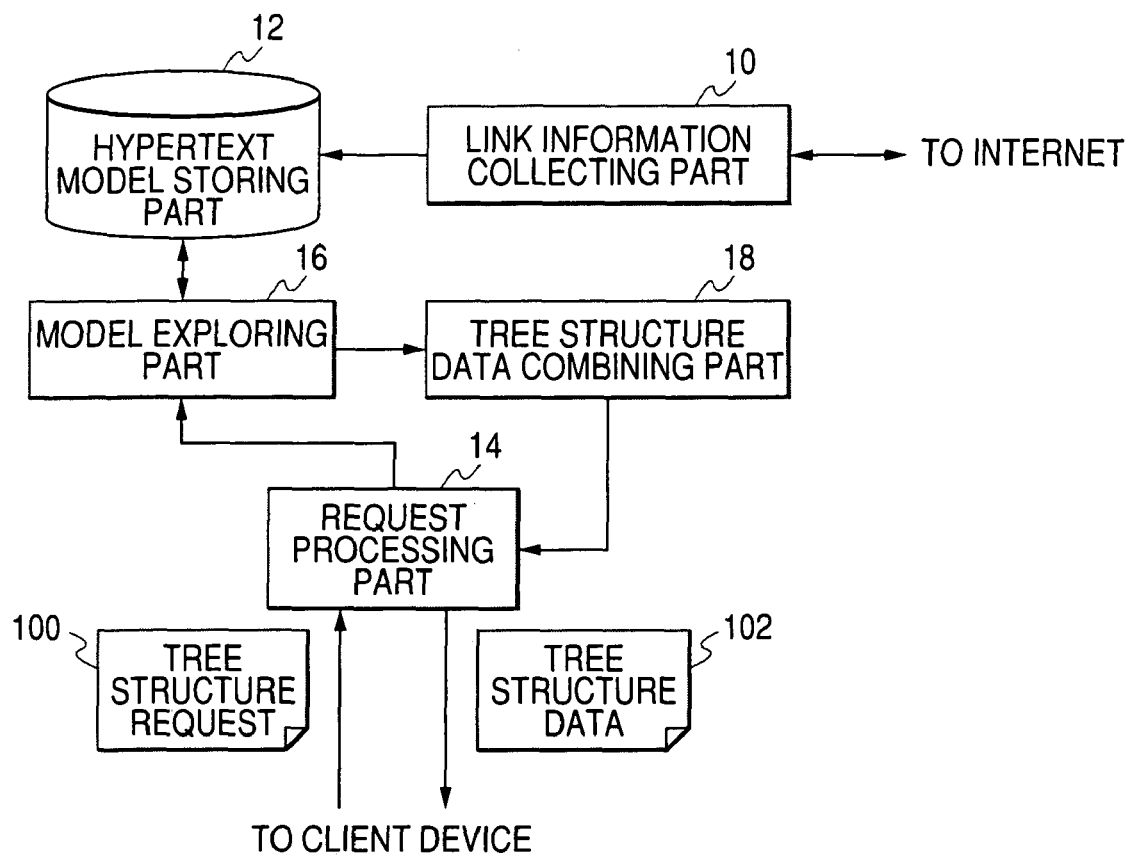
FIG. 1 is a block diagram showing a function of an example of an apparatus for forming a document group structure data according to the invention.

FIG. 1 is a block diagram showing the function of the apparatus for forming a document group structure data according to the invention. In this constitution, a link information collecting part 10 is a functional module for obtaining a hypertext structure of a web page group. The link information collecting part 10 obtains information of link relationships among the web pages (i.e., the hypertext structure), for example, by following the link descriptions in the web pages on the Internet. The link information collecting part 10 can be constituted, for example, by using the similar technique as a crawler of a robot search engine. The link information collecting part 10 executes the collection process of link information periodically or upon satisfying a prescribed collection starting condition. The collection process of link information of the link information collecting part 10 can be completed in a relatively short period of time by limiting the range for collecting link information by the link information collecting part 10 to one or plural domains having been registered.

The information of the hypertext structure thus obtained by the link information collecting part 10 is stored in a hypertext model storing part 12. The hypertext model storing part 12 stores, for example, URLs (uniform resource locators) of the respective web pages and information of the link relationships among the web pages, as information of the hypertext structure. The information stored in the hypertext model storing part 12 is renewed on execution of the collection process by the link information collecting part 10.

A request processing part 14 is a functional module for receiving a request for a tree structure data (a tree structure request 100) from a client device connected to the apparatus for forming a document group structure data through a data communication network, such as a LAN (local area network) and the Internet, and processing the request. The tree structure request 100 contains URLs of the plural web pages to be base positions in the tree structure. The request processing part 14 has, for example, such a function that provides to the client device an input screen for inputting the URLs of the plural web pages to be base positions as a web page. In this case, a user operating the client device inputs the URLs of the web pages to be the base positions on the input screen. After completing the input by the user, a submit button provided on the input screen is selected by the user, whereby the data of the tree structure request 100 containing the plural URLs thus input is sent from the client device to the apparatus for forming a document group structure data.

The request processing part 14 thus receiving the tree structure request 100 provides the URL group showing the web pages to be the base positions (hereinafter, referred to as "base pages") contained in the request to a model exploring part 16.

The model exploring part 16 forms an upper tree structure and a lower tree structure based on the URLs of the base pages received from the request processing part 14.

In the formation process of the upper tree structure, the model exploring part 16 forms the upper tree structure based on comparison of the URLs of the base pages. In the formation process, specifically, a directory, to which the base page belongs, is obtained from the URL of the page for the respective base pages. A URL of a resource is constituted with a combination of a protocol name for obtaining the resource (such as "http"), a name of a host device, in which the resource is stored, and a path to the resource in the file system of the host device. Therefore, in the case where the file name shown at the end of the path part of the URL of the base page is deleted from the URL of the page, it is understood that the remaining character string indicates a virtual directory (hereinafter, simply referred to as a "directory"), to which the base page belongs. The upper tree structure is then obtained based on the hierarchical relationship of the directories, to which the base pages belong, on the directory hierarchical structure. Nodes constituting the upper tree structure correspond to the directories, to which the base pages belong, respectively. Therefore, in the case where a directory storing the files of one base page (assumed to be directory a) is a subordinate directory of a directory storing the files of another base page (assumed to be directory b), the node corresponding to the directory a is a descendent node of the node corresponding the directory b on the upper tree structure. In the case where there is no directory, among the directories, to which the base pages belong, that is positioned between the directory a and the directory b on the directory hierarchical structure, the directory a is a child node of the directory b on the upper tree structure. The model exploring part 16 thus connects directories nearest to each other on the directory hierarchical structure (i.e., the tree structure) among the directories storing the files of the base pages containing the tree structure request 100 as a parent-child relationship on the upper tree structure. According to the process, the upper tree structure is formed.

The upper tree structure thus formed shows the hierarchical structure of the directories storing the base pages. The upper tree structure thus formed is fed to a tree structure data combining part 18.

In the formation process of the lower tree structure, the model exploring part 16 obtains lower tree structures starting from the base pages, respectively, by exploring the links of the hypertext structure stored in the hypertext model storing part 12. Therefore, in the case where, for example, there are three base pages, three lower tree structures are to be formed.

The lower tree structure is a model expressing the hypertext structure of the web page group starting from the base page in a tree structure. The hypertext structure starting from the base page constitutes a part of the hypertext structure stored in the hypertext model storing part 12. In the lower tree structure, the base page constitutes a root node, web pages linked from the base page constitute child nodes of the root node, and pages subsequently linked from the web page of the individual node constitute child nodes of that node.

The process for forming the respective lower tree structures may be basically that similar to the conventional apparatus as shown in JP-A-6-35657 and JP-A-2002-288225 having been described above. In the conventional apparatus, however, in the case where a web page A is linked from plural web pages, the link root web page that is found upon firstly reaching the web page A on following the hypertext structure is designated as a parent node of the web page A on the tree structure, but the model exploring part 16 determines the parent-child relationship among the web pages on the tree structure in a manner different from the conventional apparatus.

The model exploring part 16 compares the URL showing the storing position of the linked web page detected upon following the links of the hypertext structure with the directories storing the base pages (which can be obtained from the URLs of the base pages), and thereby determines which lower tree structures with the base pages as a root node should incorporate the linked web page. The determination process may be, for example, as follows.

Such a case is to be considered that a lower tree structure is formed with a certain base page (hereinafter, referred to as a focused base page for identification) among the plural base pages as a root node. In this case, the model exploring part 16 follows the links of the hypertext structure starting from the focused base page, and upon detecting a linked web page, determines as to whether or not the linked page is incorporated into the lower tree structure with the focused base page as the root node. On the directory hierarchical structure, i.e., the hierarchical structure of the URL in this case, it is determined as to whether or not the directory storing the focused base page is the nearest ancestor of the URL of the linked page among the directories storing the base pages (including the focused base page) designated by a user. In the determination, in the case where, for example, the directory storing the focused base page has such a URL that agrees with the URL of the linked page in the longest length among the directories storing the base pages, it can be determined that the directory of the focused base page is the nearest ancestor of the linked page; In the case where it is determined that the directory of the focused base page is the nearest ancestor of the linked page, the linked page is incorporated as a real node into the lower tree structure with the focused base page as a root node (i.e., the linked page is designated as a child node of the link root page). Subsequently, exploration of the hypertext structure is continued beyond the linked page.

In the case where the directory of the focused base page is not the nearest ancestor of the linked page, on the other hand, the linked page is not incorporated into the lower tree structure with the focused base page as a starting point. In this case, the hypertext structure beyond the linked page is not explored in the process for forming the lower tree structure with the focused base page as a starting point. The exploration of the hypertext structure beyond the linked page is carried out in a process for forming another lower tree structure containing the linked page as a real node.

According to the procedures, the positions of the nodes corresponding to the web pages are not changed in the tree structure even in the case where the order of exploration of the links of the hypertext structure is changed (as far as the stored positions of the web pages on the Internet are not changed).

The model exploring part 16 repeats the aforementioned procedures by the base pages to form lower tree structures with the base pages as a root node for each of the base pages. The information of plural lower tree structures thus formed is fed to the tree structure data combining part 18.

The tree structure combining part 18 combines the upper tree structure and the plural lower tree structures thus received from the model exploring part 16 to form a tree structure data showing the entire tree structure corresponding to the tree structure request 100.

In the combining process, the root nodes of the lower tree structures are linked to the nodes of the upper tree structure. In other words, the nodes of the upper tree structure are connected as child nodes the root nodes of the lower tree structures corresponding to the base pages stored in the directories corresponding to the nodes of the upper tree structure, respectively.

The tree structure data 102 thus formed is sent by the request processing part 14 to the client device having sent the tree structure request 100.

Figure 2:
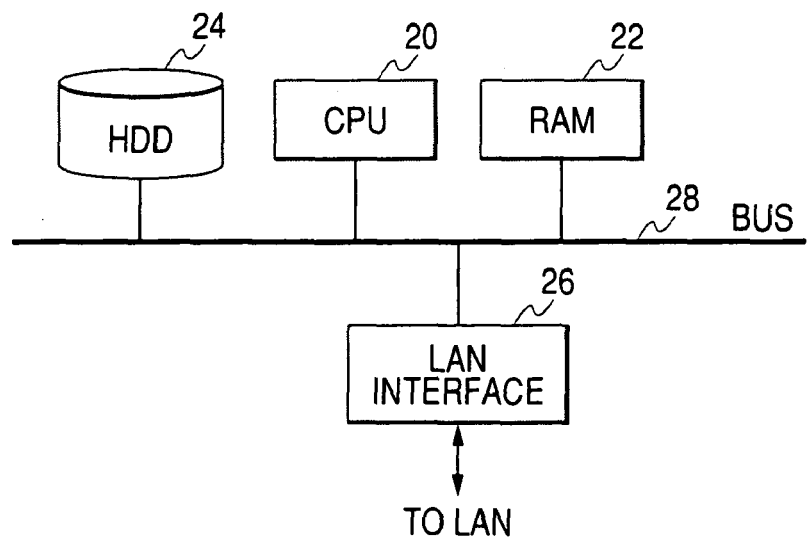
FIG. 2 is a schematic diagram showing a hardware constitution of a computer system formed the foundation of the apparatus shown in FIG. 1.

An example of the functional constitution of the apparatus for forming a document group structure data according to the invention has been described. The apparatus for forming a document group structure data can be constituted by using an ordinary computer system. For example, a typical computer system contains a CPU (central processing unit) 20, a RAM (random access memory) 22, an HDD (hard disk drive) 24 and a LAN interface 26 interconnected through a bus 28 as shown in FIG. 2. The apparatus for forming a document group structure data shown in FIG. 1 can be obtained by installing a program describing the functions of the functional modules 10, 14, 16 and 18 in FIG. 1 into the HDD 24 of the computer system in FIG. 2. The functions are carried out by executing the program by the CPU 20 utilizing the RAM 22. The apparatus is connected to a local area network through the LAN interface 26, and further connected to the Internet therethrough, whereby the apparatus receives a tree structure request 100 from a client device on the LAN or the Internet.

Details of the process carried out by the apparatus for forming a document group structure data will be described with reference to a specific example.

Figure 3:
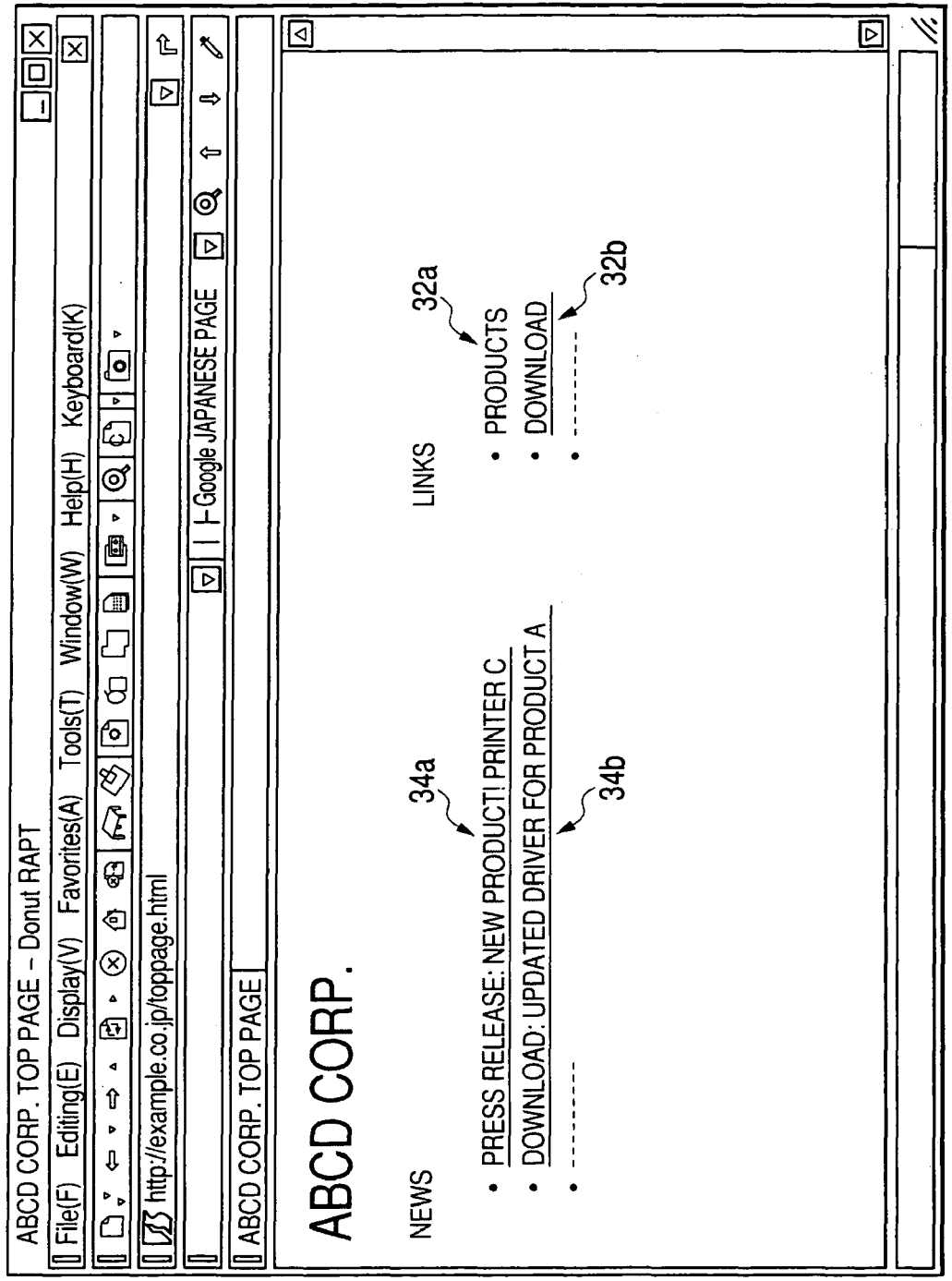
FIG. 3 is an illustration showing an example of a display window of a browser upon showing a top page of a web site of "ABCD Corp." on the browser.

FIG. 3 is an illustration showing an example of a display window of a web browser upon showing a top page of a web site of "ABCD Corp." on the browser. The top page contains links 34*a* and 34*b* to web pages showing renewal information, in addition to links 32*a* and 32*b* to index pages by category, such as "Products" and "Download".

Figure 4:
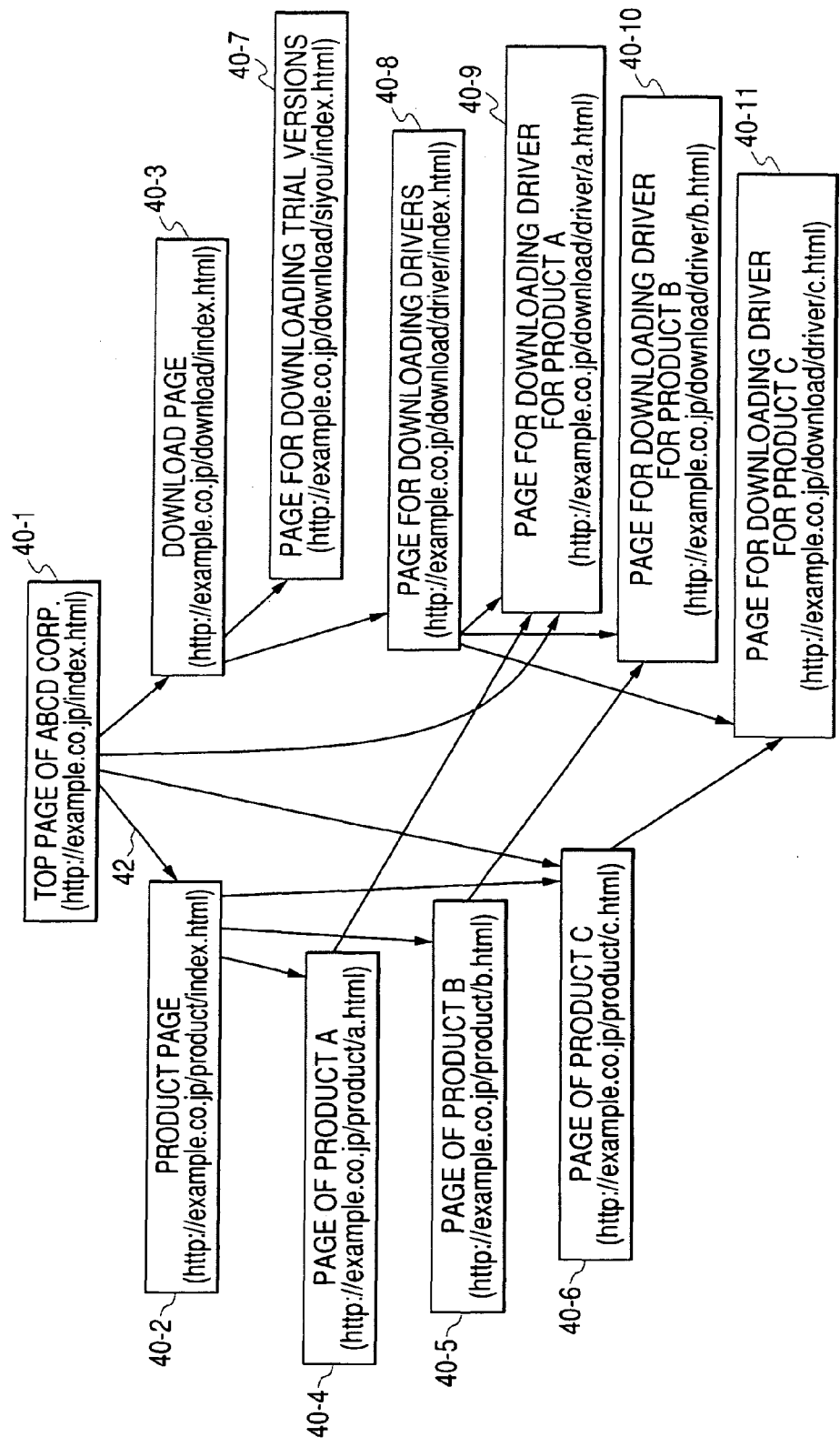
FIG. 4 is a diagram showing a hypertext structure constituted by a web page group of the web site of "ABCD Corp."

FIG. 4 is a diagram showing a hypertext structure constituted by a web page group of the web site of "ABCD Corp.". Nodes 40-1, 40-2, . . . and 40-11 indicate web pages inside the web site. Arrows 42 connecting the nodes 40 denote links among the web pages. The node positioned at the root of the arrow is the link root page, and the node positioned at the tip end of the arrow is the linked page. For example, the top page 40-1 has links to a product page 40-2, a download page 40-3, a page of product C 40-6, and a page for downloading a driver for product A 40-9. What is shown in FIG. 4 can be considered as an example of the hypertext structure stored in the hypertext model storing part 12 in FIG. 1.

Figure 5:
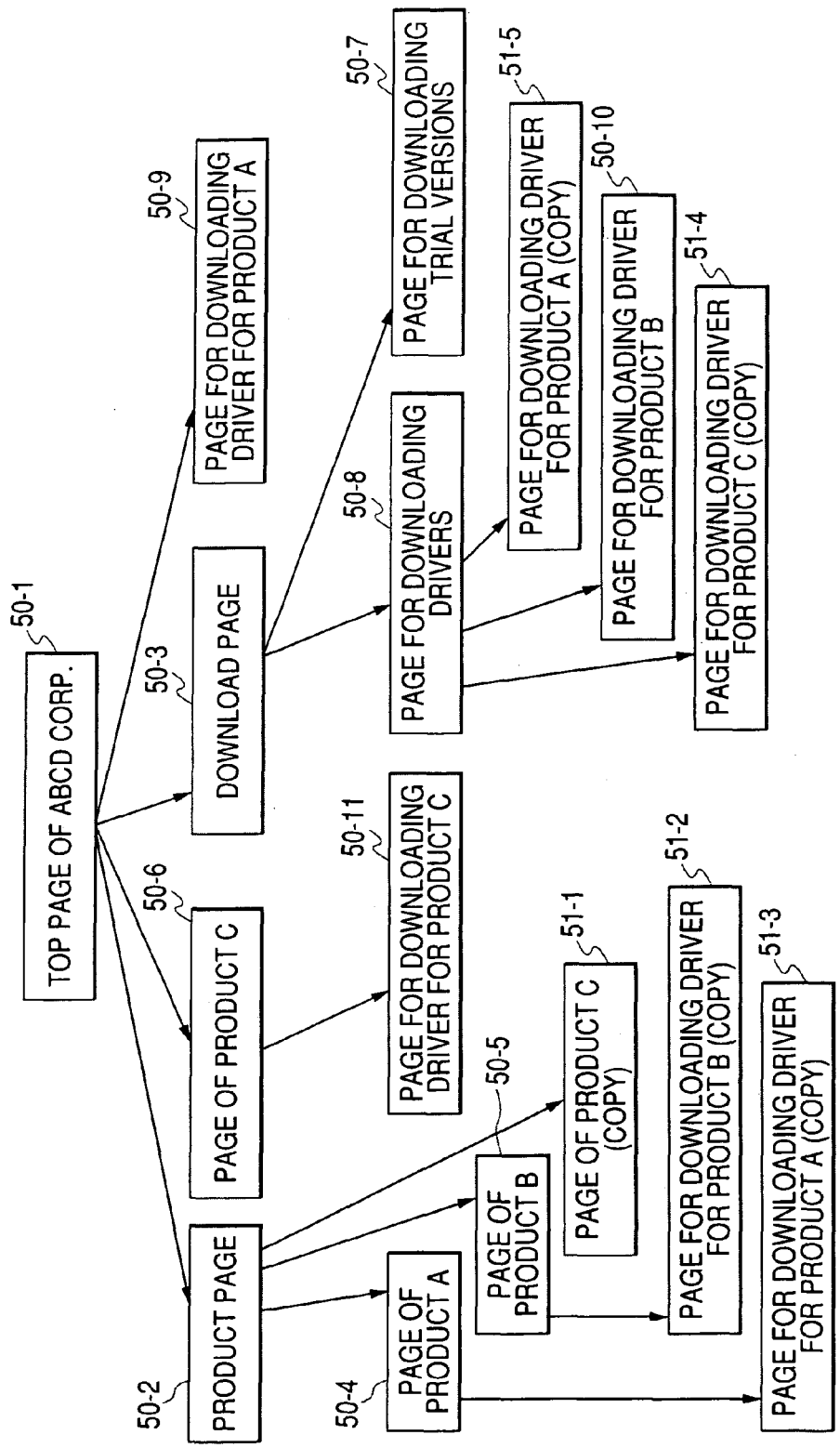
FIG. 5 is a diagram showing a tree structure formed from the hypertext structure shown in FIG. 4 by a conventional apparatus.

In the case where a tree structure is formed from the hypertext structure shown in FIG. 4 by the conventional apparatus, the structure shown in FIG. 5, for example, is formed. This example is a tree structure formed from a top page 50-1 as a starting point, in which the top page 50-1 is a root node of the entire tree structure. The root node has four child nodes, i.e., a product page 50-2, a download page 50-3, a page of product C 50-6 and a page for downloading a driver for product A 50-9. The nodes have linked pages as child nodes, respectively. At this time, a linked page having been registered as the node on the tree structure is designated as a reference node (nodes 51-1 to 51-5 indicated with the term "copy" in the example shown in FIG. 5) corresponding to the node having been registered. The reference node has no child node. The node registered on the tree structure is referred to as a real node as compared to the reference node. The real node may have a child node. For example, in the hypertext structure shown in FIG. 4, the product page 40-2 has links to pages of products A to C 40-4, 40-5 and 40-6, but in the tree structure shown in FIG. 5, the page of product C 40-6 has been registered as a child node 50-6 of the top page 50-1, and therefore, a copy 51-1 of the page of product C, i.e., a reference node, is linked as a child node to the product page 50-2 on the tree structure. On the other hand, the pages of products A and B 50-4 and 50-5 are incorporated into the tree structure as real nodes because these have not yet registered.

In the case where the tree structure obtained by the conventional technique is expressed, for example, on a navigation window of a browser, the page of product C 50-6 and the page for downloading a driver for product A 50-9, which merely show specific items of the categories, are shown on the same hierarchical level, i.e., just under the top page 50-1, as the product page 50-2 and the download page 50-3 representing the categories. The conceptual relationship among the pages is difficult to be comprehended by a user when web pages belonging to different conceptual levels are shown on the same level. This is inconvenience for searching a desired web page on a tree structure by a user. For example, on a file management screen showing a tree structure of directories, such a display mode is often employed due to limitation on screen area that the entire tree structure is not displayed, but only nodes on the uppermost one level are displayed, and upon clicking a desired node among the nodes, child nodes of the clicked node are then displayed. In the case where the same display mode is employed for displaying the tree structure shown in FIG. 5 on a navigation window of a web page, it is difficult for a user to expect the sequence for following the nodes to reach the desired page.

Furthermore, even though a user memorizes on one occasion that the page of product C 50-6 is present just under the top page 50-1, the page 50-6 is moved to a position just under another node with the lapse of time because the renewal information on the top page is often changed. Accordingly, there are some cases where it is difficult for a user to search a page to be accessed on a tree structure.

Figure 6:
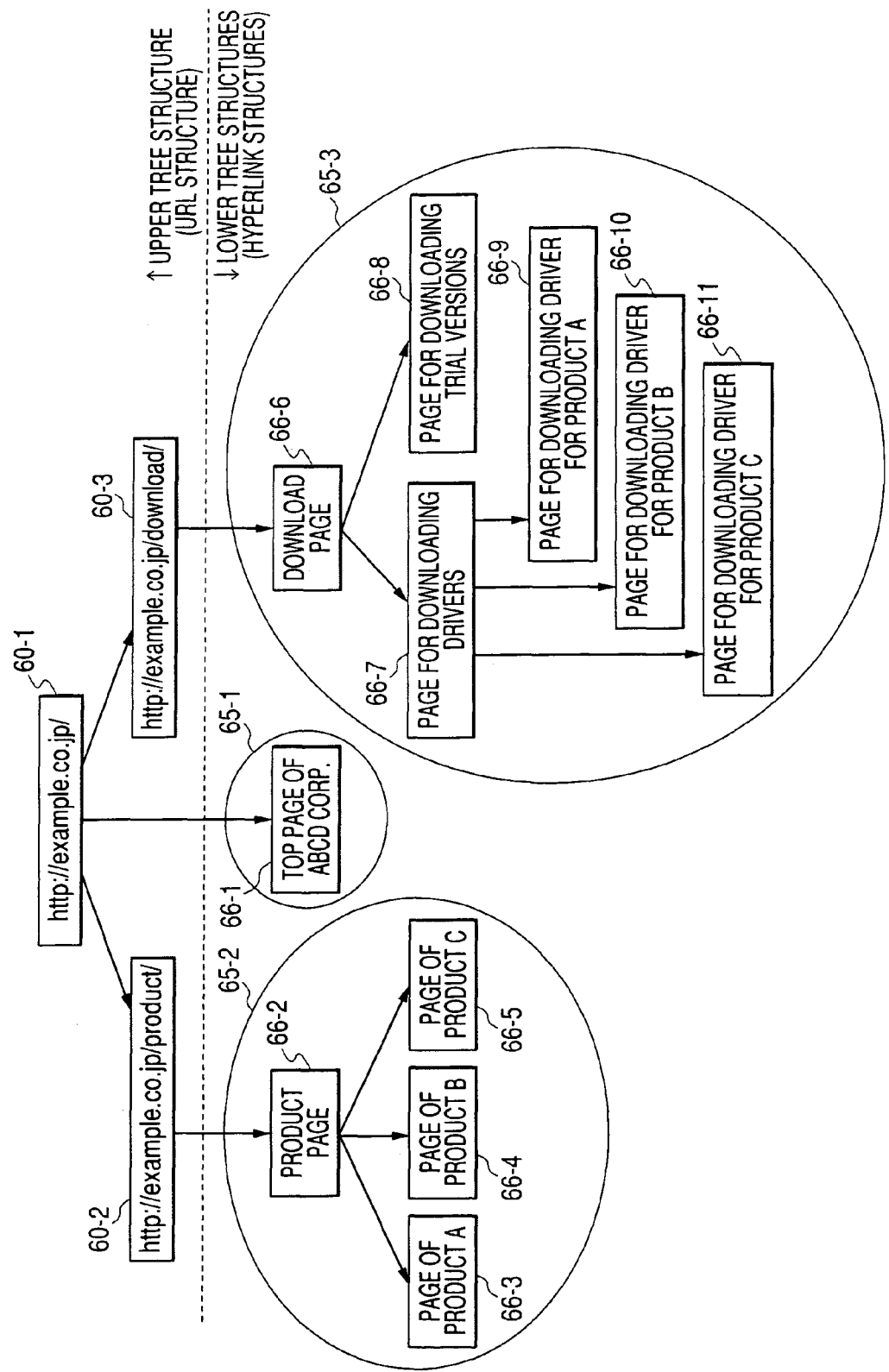
FIG. 6 is a diagram showing an example of a tree structure formed from the hypertext structure shown in FIG. 4 by an apparatus for forming a document group structure data according to the invention.

On the other hand, an example of a tree structure formed by the apparatus for forming a document group structure data according to the embodiment is shown in FIG. 6. The example shown in FIG. 6 is a tree structure formed upon designating the "top page of ABCD Corp.", the "product page" and the "download page" in the hypertext structure shown in FIG. 4 as base pages by a user.

In the example shown in FIG. 6, the upper tree structure is constituted by virtual directories 60-1 ("http://example.co.jp/"), 60-2 ("http://example.co.jp/product/") and 60-3 ("http://example.co.jp/download/") belonging to the base pages, i.e., the "top page of ABCD Corp.", the "product page" and the "download page", respectively. For example, the directory "http://example.co.jp/product/" is positioned just under the directory "http://example.co.jp/", and therefore, the directory 60-1 has the directory 60-2 as a child on the upper tree structure.

Furthermore, the example shown in FIG. 6 contains, as a lower tree structure group, sub-trees (partial trees) 65-1, 65-2 and 65-3 with the base pages, i.e., the top page of ABCD Corp. 66-1, the product page 66-2 and the download page 66-6, respectively, as root nodes. The sub-trees 65 are the lower tree structures with the base pages as a starting point, respectively.

The sub-trees 65 most likely indicate the concept classification of the web pages in a better manner, in comparison to sub-trees of a tree structure formed by the conventional apparatus. The reason for this is followings.

Specifically, in the case where a web designer designs a web site, it is likely, in general, that a conceptually organized directory structure is formed, and files describing web pages are stored in appropriate directories in the directory structure, rather than storing the filed in random positions (directories) in view of efficiency in data management. In the ideal case, the hierarchical structure of the directory group, in which the web pages are stored, becomes one expressing the conceptual hierarchical classification constituted by the web pages. Although the ideal directory structure is not always constituted in a practical standpoint, the directory structure reflects the conceptual classification of web pages to a certain extent under consideration of efficiency in data management in the future. In the apparatus for forming a document group structure data according to the embodiment, on the other hand, a node of a base page has, appearing thereunder (as descendents), only a directory, to which the base page belongs, or nodes of web pages belonging to directories under the directory. Therefore, it can be comprehended that the sub-tree with the base page as a root node indicates pages belonging to the conceptual classification corresponding to the directory storing the base page.

As described in the foregoing, the sub-trees 65 in the tree structure formed by the apparatus of the embodiment are conceptually classified, and therefore, a user can easily search a desired web page on the tree structure.

For example, "the page of product C" is a child node of the "top page of ABCD Corp." in the tree structure formed by the conventional apparatus shown in FIG. 5, but in the tree structure shown in FIG. 6, it is a child node 66-5 of the "product page" 66-2. According to the apparatus of the embodiment, even in the case where a link from the "top page of ABCD Corp." to the "page of product C" is detected upon following the links of the hypertext structure, the URL of the directory of the "product page" 60-2 is nearer than the URL of the directory of the "top page of ABCD Corp." 60-1 to the URL of the "page of product C" 66-5, and therefore, the "page of product C" does not become a child node of the "top page of ABCD Corp." on the tree structure. This is because a directory storing the product information is formed in the web site, and the "product page" containing the index information and the pages showing information of individual products, such as the "page of product A", are stored in the directory. According to the embodiment, such sub-trees 65-1, 65-2 and 65-3 can be formed that are classified corresponding to the directory structure of the web site, i.e., the conceptual hierarchical structure of the web pages.

In the tree structure shown in FIG. 6, the root nodes 66-1, 66-2 and 66-3 of the sub-trees 65-1, 65-2 and 65-3 are connected to the nodes 60-1, 60-2 and 60-3 of the upper tree structure, respectively, as child nodes.

The tree structure shown in FIG. 6 is a mere example, in which one root node of the sub-tree is connected to one node of the upper tree structure. In the case where plural web pages stored in the same directory are designated as base pages, sub-trees are formed with the base pages as a starting point, and therefore, the node of the directory of the upper tree structure is connected to root nodes of the plural sub-trees.

In the case where the tree structure shown in FIG. 6 is displayed on a navigation screen of a web page, the nodes of directories having the same conceptual level are displayed on the same level at least in the upper tree structure. The nodes of the base pages of the lower tree structure are linked to the nodes of the upper tree structure, and the upper tree structure is determined by the directory structure (i.e., the hierarchical structure of URLs), which is less changed than the links of the hypertext structure. Therefore, the positions of the base pages in the total tree structure are less changed. The sub-tree 65 extending from the node of the upper tree structure contains the nodes of the web pages belonging to the same directory, i.e., the same conceptual classification. It is considered that the stored positions of the files themselves of the web pages are less changed although the links described on the web pages are variously changed by renewal. Therefore, it is understood that the positions of the respective web pages in the tree structure shown in FIG. 6 are less changed than the tree structure formed by the conventional technique. According to the consideration, a user can easily explore a desired web page by using the tree structure according to the invention.

FIGS. 7A and 7B show an example of data showing the tree structure shown in FIG. 6.

FIG. 7A shows the data contents of the upper tree structure among the entire tree structure. The data contains a node ID 700 as identification information of the node constituting the upper tree structure, a URL 702 of a directory corresponding to the node, and child node information 704 of the node. The child node information 704 contains node IDs of child nodes of the node. The child nodes of the node of the upper tree structure include two kinds of nodes, i.e., other nodes (directories) on the upper tree structure and a root node (web page) of the lower tree structure. Among these, the inclusion of the root node of the lower tree structure in the child node information 704 combines the upper tree structure with the lower tree structure.

On the other hand, FIG. 7B shows the data contents of the lower tree structure among the entire tree structure. The data contains a node ID 710 as identification information of the node constituting the lower tree structure, a URL 712 of a directory corresponding to the node, a display data 713 of the node, and child node information 714 of the node. The child node information 714 contains node IDs of other web pages. The display data 713 is a character string added as a description of the node upon displaying the tree structure. A character string of a title tag of a web page corresponding to the node can be used as the display data 713. The node of the upper tree structure is a directory but not a web page, and therefore, it has no title tag used as a character string. Accordingly, the node of the upper tree structure may be displayed with such a character string as the entire URL of the node or the tail end directory of the URL for identification.

As described in the foregoing, the tree structure data obtained by the apparatus according to the embodiment is a combination of the upper tree structure derived from the directory structure and the group of lower tree structures derived from the hypertext structure. The upper tree structure is substantially static even though the links are changed, and therefore, the positions of the base pages on the tree structure are substantially static. Because the positions of the base pages are thus substantially fixed on the tree structure, a user can easily explore web pages. Furthermore, in the tree structure data obtained by the apparatus according to the embodiment, the lower tree structure reflects the link structure, which is to be renewed as necessity arises.

In the tree structure shown in FIG. 6, even when there is a link on the hypertext structure, it is not always expressed on the tree structure. For example, the "top page of ABCD Corp." is linked to the "page of product C" on the hypertext structure, but the link is not shown on the tree structure. However, it is a mere example, and instead of this, the "page of product C" may be connected as a reference node just under the node 66-1 of the "top page of ABCD Corp." similarly to the conventional technique. The real node 66-5 showing the "page of product C" is present just under the node 66-2 of the "product page". In the case herein where a link root page and a linked page belong to different classification (sub-trees), respectively, in a conceptual classification based on a directory structure, link relationships among the pages can be intelligible by connecting the linked page is connected as a reference node to the real node of the link root page on the tree structure. In this case, the reference node is shown in a different display mode from the real node on the display of the tree structure.

FIG. 8 shows an example of data of a lower tree structure containing reference nodes. The example contains, in addition to the data items shown in FIG. 7B, a node class 716 showing as to whether the node is a real node or a reference node. The child node 714 also contains node IDs of the reference nodes.

The embodiment having been described is a mere example, and various modified embodiments can be considered within the scope of the invention.

In the aforementioned embodiment, the hypertext structure of the web pages is once stored in the hypertext model storing part 12, and in the case where the tree structure request 100 is issued by a user, the hypertext model storing part 12 is explored to form the tree structure data. Instead of the procedures, for example, the model exploring part 16 may directly explore the Internet depending on the tree structure request 100 issued by a user to form a tree structure data.

It is assumed in the hypertext structure shown in FIG. 4 that a link to a "press release page of product C" (http://example-.co.jp/release/c.html) is described in the "page of product C" 40-6. In this case, the URL (http://example.co.jp/release/ c.html) of the "press release page of product C" is not a subordinate of the node 60-2 (FIG. 6), which is the superordinate of the "page of product C" in the upper tree structure. It is furthermore assumed that it is impossible to reach the press release page by following the links from the other base pages. In this case, the press release page does not belong to any lower tree structure starting the base pages designated by a user. In the case herein where there appears upon exploring a hypertext structure such a web page that does not belong to any lower tree structure starting from base pages designated by a user, the model exploring part 16 regards the web page as a base page, newly adds a node showing a directory storing the files of the web page to the upper tree structure, and forms a lower tree structure with the page as a root node. The node to be added to the upper tree structure is incorporated into the upper tree structure in the form that reflects the hierarchical relationship thereof with the other nodes on the directory structure. A reference node showing the web page is connected to the link root page of the web page as a child node on the lower tree structure.

Furthermore, although plural base pages are designated by a user upon requesting a tree structure in the aforementioned embodiment, the procedure is not essential. For example, in the case where plural base pages per one web site are previously registered to the apparatus for forming a document group structure data, a user can obtain a tree structure data of a desired web site according to the embodiment only by designating the web site. The registration of base pages for the web site may be varied by users.

It is also possible that another condition is input by a user instead of the plural base pages, whereby the apparatus for forming a document group structure data selects plural base pages pursuant to the condition. Examples of the condition include a combination of a name of a web site (a URL of a web server) and a number of hierarchical layers. In the case where the condition is designated by a user, the model exploring part 16 follows the links starting from the top page of the web site to form a tree structure equivalent to the conventional technique. The model exploring part 16 then inspects URLs of the node appearing on the tree structure, and selects such nodes as base pages that are within the designated number of hierarchical layers from the directory storing the top page in the hierarchical structure of the URL. After thus determining the base pages, the same procedures as in the aforementioned embodiment may be carried out.

The apparatus for forming a document group structure data in the aforementioned embodiment is in a form of a server that provides a tree structure data corresponding to a request from a client device. The functions of the apparatus for forming a document group structure data can be installed in a personal computer as a program of instructions executable by the personal computer.

In the foregoing description, such an example has been described in that a hypertext structure of a web page group on the Internet is displayed in a tree structure. However, it is apparent from the foregoing description that the invention can be applied not only to a web page group, but also to a general document group that is stored in a hierarchical directory structure and forms a hypertext structure.

The entire disclosure of Japanese Patent Application No. 2003-306898 filed on Aug. 29, 2003 including specification, claims, drawings and abstract is incorporated herein by reference in its entirety.

What is claimed is:

1. An apparatus for forming a document group structure data that forms a tree structure data showing a tree structure corresponding to a hypertext structure constituted by a document group contained in a hierarchical directory structure, based on the hypertext structure, the apparatus for forming a document group structure data comprising:
a processor configured to:
specify a plurality of documents to be positionally fixed on the tree structure as base documents based on an input from a user;
form an upper tree structure data showing a hierarchical relation among the base documents based on positional information of the base documents in the directory structure; and
form a lower tree structure data showing tree structures of document groups having the base documents as root nodes, respectively, by following links of the hypertext structure starting from the respective base documents, determining whether or not a linked document detected upon following the links of the hypertext structure starting from one of the base documents is incorporated into the lower tree structure with the base document as a root node, and determining to incorporate the linked document into the lower tree structure of the base document as a root node in a case where, among directories storing the plurality of base documents, a directory storing the base document as a starting point is the nearest ancestor with respect to a stored position of the linked document in the hierarchical directory structure;
form a tree structure data showing the hypertext structure by combining the upper tree structure data and the respective lower tree structure data, and
at least one of an output device, display, or storage device for outputting, displaying or storing the tree structure data.

2. The apparatus for forming a document group structure data as claimed in claim 1, wherein the processor is further configured to receive an input of the positional information of the respective base documents in the directory structure from a user, and specify the base documents according to the input.

3. The apparatus for forming a document group structure data as claimed in claim 1, wherein forming the lower tree structure further comprises incorporating the linked document into the lower tree structure as a reference node having no child node based on a determination that, among directories storing the plurality of base documents, a directory storing the base document as a starting point is not the nearest ancestor with respect to a stored position of the linked document in the hierarchical directory structure.

4. A method for forming a document group structure data that forms a tree structure data showing a tree structure corresponding to a hypertext structure constituted by a document group contained in a hierarchical directory structure, based on the hypertext structure by a computer processing, the method for forming a document group structure data comprising:
specifying plural documents to be positionally fixed on the tree structure as base documents based on an input from a user;
forming an upper tree structure data showing a hierarchical relation among the base documents based on positional information of the base documents in the directory structure;
forming lower tree structure data showing tree structures of document groups having the base documents as root nodes, respectively, by following links of the hypertext structure starting from the respective base documents, determining as to whether or not a linked document detected upon following the links of the hypertext structure starting from one of the base documents is incorporated into the lower tree structure with the base document as a root node, and determining to incorporate the linked document into the lower tree structure of the base document as a root node in a case where, among directories storing the plurality of base documents, a directory storing the base document as a starting point is the nearest ancestor with respect to a stored position of the linked document in the hierarchical directory structure;

forming a tree structure data showing the hypertext structure by combining the upper tree structure data and the respective lower tree structure data; and at least one of outputting, displaying or storing the tree structure data.

5. A non-transitory storage medium readable by a computer, the non-transitory storage medium storing a program of instructions executable by the computer to perform a function for forming a document group structure data that forms a tree structure data showing a tree structure corresponding to a hypertext structure constituted by a document group contained in a hierarchical directory structure, based on the hypertext structure, the function for forming a document group structure data comprising steps of:

specifying a plurality of documents to be positionally fixed on the tree structure as base documents based on an input from a user;

forming an upper tree structure data showing a hierarchical relation among the base documents based on positional information of the base documents in the directory structure;

forming lower tree structure data showing tree structures of document groups having the base documents as root nodes, respectively, by following links of the hypertext structure starting from the respective base documents, determining as to whether or not a linked document detected upon following the links of the hypertext structure starting from one of the base documents is incorporated into the lower tree structure with the base document as a root node, and determining to incorporate the linked document into the lower tree structure of the base document as a root node in a case where, among directories storing the plurality of base documents, a directory storing the base document as a starting point is the nearest ancestor with respect to a stored position of the linked document in the hierarchical directory structure;

forming a tree structure data showing the hypertext structure by combining the upper tree structure data and the respective lower tree structure data; and at least one of the outputting storing or displaying the tree structure data.

* * * * *